(12) United States Patent
Nimura et al.

(10) Patent No.: US 10,030,167 B2
(45) Date of Patent: Jul. 24, 2018

(54) METHOD FOR PRODUCING BLADE MEMBER

(71) Applicant: SUMITOMO RIKO COMPANY LIMITED, Komaki-shi, Aichi (JP)

(72) Inventors: Yasunori Nimura, Komaki (JP); Satoshi Suzuki, Komaki (JP); Shimpei Miyagawa, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 41 days.

(21) Appl. No.: 15/184,269

(22) Filed: Jun. 16, 2016

(65) Prior Publication Data

US 2016/0297989 A1    Oct. 13, 2016

Related U.S. Application Data

(63) Continuation of application No. PCT/JP2015/055562, filed on Feb. 26, 2015.

(30) Foreign Application Priority Data

Mar. 28, 2014  (JP) .................. 2014-067770

(51) Int. Cl.
C09D 175/04 (2006.01)
C08J 7/04 (2006.01)
(Continued)

(52) U.S. Cl.
CPC ......... *C09D 175/04* (2013.01); *C08G 18/025* (2013.01); *C08G 18/4238* (2013.01);
(Continued)

(58) Field of Classification Search
None
See application file for complete search history.

(56) References Cited

U.S. PATENT DOCUMENTS

2004/0170841 A1    9/2004  Tomiyama et al.
2006/0216526 A1    9/2006  Tomiyama et al.
(Continued)

FOREIGN PATENT DOCUMENTS

JP    9-212059      8/1997
JP    2003-140520 A    5/2003
(Continued)

OTHER PUBLICATIONS

Caplus/wpix/japio abstracts of JP2010-032703, Feb. 2010.*
(Continued)

*Primary Examiner* — Erma C Cameron
(74) *Attorney, Agent, or Firm* — Westerman, Hattori, Daniels & Adrian, LLP

(57) ABSTRACT

A method for producing a blade member 1 includes an impregnation step of impregnating at least a portion of a surface of a blade portion 11 made of a polyurethane rubber with a surface treatment liquid that includes a salt of diazabicycloundecene and a carbodiimide-modified polyvalent isocyanate compound including a carbodiimide-modified polyvalent isocyanate dimer and a carbodiimide-modified polyvalent isocyanate trimer or higher multimer, in which a content of the trimer or higher multimer is 50% by mass or less, and a cured layer formation step of heating and curing the carbodiimide-modified polyvalent isocyanate compound which is impregnated into the blade portion 11, to form a cured layer 110.

20 Claims, 3 Drawing Sheets

(51) Int. Cl.
  *G03G 21/00*   (2006.01)
  *C08G 18/79*   (2006.01)
  *C08G 18/02*   (2006.01)
  *C08G 18/42*   (2006.01)
  *C08J 7/06*    (2006.01)

(52) U.S. Cl.
  CPC .............. *C08G 18/797* (2013.01); *C08J 7/04* (2013.01); *C08J 7/06* (2013.01); *G03G 21/0017* (2013.01); *C08J 2375/06* (2013.01)

(56) References Cited

U.S. PATENT DOCUMENTS

| | | | |
|---|---|---|---|
| 2009/0022530 A1* | 1/2009 | Inoue | G03G 21/0017 399/350 |
| 2009/0041519 A1 | 2/2009 | Uchida et al. | |
| 2009/0154971 A1 | 6/2009 | Itoh et al. | |
| 2012/0163890 A1* | 6/2012 | Uematsu | G03G 21/0017 399/350 |
| 2012/0285612 A1* | 11/2012 | Burks | C08G 18/2063 156/242 |

FOREIGN PATENT DOCUMENTS

| | | |
|---|---|---|
| JP | 2004-280086 A | 10/2004 |
| JP | 2007-94192 | 4/2007 |
| JP | 2009-63993 | 3/2009 |
| JP | 2010032703 * | 2/2010 |

OTHER PUBLICATIONS

Machine translation of JP2010-032703, Feb. 2010.*
International Search Report dated Apr. 14, 2015, issued in counterpart International Application No. PCT/JP2015/055562 (2 pages).
Notification of Transmittal of Translation of the International Preliminary Report on Patentability (Form PCT/IB/338) issued in counterpart International Application No. PCT/JP2015/055562 dated Oct. 13, 2016, with Forms PCT/IB/373 and PCT/ISA/237. (5 pages).
Office Action dated May 21, 2018, issued in counterpart Chinese Application No. 201580014518.3, with English translation. (13 pages).

* cited by examiner

METHOD FOR PRODUCING BLADE MEMBER

TECHNICAL FIELD

The present disclosure relates to a method for producing a blade member.

BACKGROUND ART

In a conventional electrophotographic image forming device, a blade member serving as a cleaning blade has been disposed around a photoreceptor, a blade portion of the blade member has been in sliding contact with the photoreceptor, and thus residual toner remaining on the surface of the photoreceptor has been removed by scraping off. For the material of the blade portion, a flexible and relatively inexpensive polyurethane rubber is generally used.

A polyurethane rubber generally has a high friction coefficient. Therefore, a surface treatment liquid including an isocyanate compound and a polymerization catalyst such as a quaternary ammonium salt or a carboxylic acid salt is impregnated into a blade portion made of a polyurethane rubber, and thereafter the impregnated isocyanate compound is heated and cured to thereby form a cured layer for an increase in surface hardness (see Patent Document 1).

PRIOR ART DOCUMENT

Patent Document

Patent Document 1: JP-A-2004-280086

SUMMARY OF THE INVENTION

The prior art, however, has the following problem. That is, when the isocyanate compound and the polymerization catalyst are mixed in advance to prepare the surface treatment liquid, the polymerization reaction of the isocyanate compound progresses at an ordinary temperature before the surface treatment liquid is impregnated into the blade portion, namely, before heating, and gelation is caused. Therefore, the surface treatment liquid is poor in stability and the surface treatment liquid cannot be used for a long time.

In order to avoid the above problem, a method is considered in which the isocyanate compound and the polymerization catalyst are mixed immediately before impregnation to prepare the surface treatment liquid. In such a method, however, the polymerization reaction progresses during the impregnation treatment to thereby cause a cured product of the isocyanate compound to be formed on the surface of the blade portion, making it difficult to remove the cured product and/or causing uneven curing to occur.

The present disclosure has been made in view of the above background, and has been made so as to provide a method for producing a blade member in which a polymerization reaction of an isocyanate compound is suppressed until the completion of impregnation of a surface treatment liquid into a blade portion and the polymerization reaction is promoted during heating to thereby allow a cured layer to be formed.

One aspect of the present disclosure resides in a method for producing a blade member to be used for removal of residual toner remaining on a surface of a counterpart member in an electrophotographic image forming device, by sliding contact with the counterpart member, the method including:

an impregnation step of impregnating at least a portion of a surface of a blade portion made of a polyurethane rubber with a surface treatment liquid that includes a salt of diazabicycloundecene and a carbodiimide-modified polyvalent isocyanate compound including a carbodiimide-modified polyvalent isocyanate dimer and a carbodiimide-modified polyvalent isocyanate trimer or higher multimer, in which a content of the trimer or higher multimer is 50% by mass or less; and a cured layer formation step of heating and curing the carbodiimide-modified polyvalent isocyanate compound which is impregnated into the blade portion, to form a cured layer.

The method for producing a blade member includes the impregnation step and the cured layer formation step. In particular, in the method for producing a blade member, the particular surface treatment liquid is used in the impregnation step.

The surface treatment liquid contains the carbodiimide-modified polyvalent isocyanate compound and also the salt of diazabicycloundecene. Therefore, the surface treatment liquid can suppress the polymerization reaction of the carbodiimide-modified polyvalent isocyanate compound in the surface treatment liquid at an ordinary temperature before heating. Therefore, the surface treatment liquid can be stably used for a long time with no gelation before heating.

In addition, the surface treatment liquid, in which the content of the carbodiimide-modified polyvalent isocyanate trimer or higher multimer that has a larger molecular weight than the carbodiimide-modified polyvalent isocyanate dimer or the like is regulated to 50% by mass or less. Accordingly, the rate of impregnation of the surface treatment liquid into the blade portion can be enhanced.

Furthermore, the surface treatment liquid includes the carbodiimide-modified polyvalent isocyanate trimer or higher multimer that is lower in reactivity than the carbodiimide-modified polyvalent isocyanate dimer or the like. Accordingly, the reactivity of the carbodiimide-modified polyvalent isocyanate compound can be suppressed.

Therefore, in the impregnation step, the surface treatment liquid can be relatively quickly impregnated into the blade portion with no gelation, and the polymerization reaction of the carbodiimide-modified polyvalent isocyanate compound can be suppressed until the completion of the impregnation. Moreover, the surface treatment liquid can be impregnated into the blade portion without unevenness. Herein, the surface treatment liquid remaining on the surface of the blade portion after the impregnation is easily removed because the carbodiimide-modified polyvalent isocyanate compound is hardly cured.

In the cured layer formation step after the impregnation step, the salt of diazabicycloundecene can promote the polymerization reaction of the carbodiimide-modified polyvalent isocyanate compound during heating, to form a cured layer in the blade portion.

Accordingly, the present disclosure can provide a method for producing a blade member in which a polymerization reaction of an isocyanate compound is suppressed until the completion of impregnation of a surface treatment liquid into a blade portion and the polymerization reaction is promoted during heating to thereby allow a cured layer to be formed.

MODE FOR CARRYING OUT THE INVENTION

Figure 1:
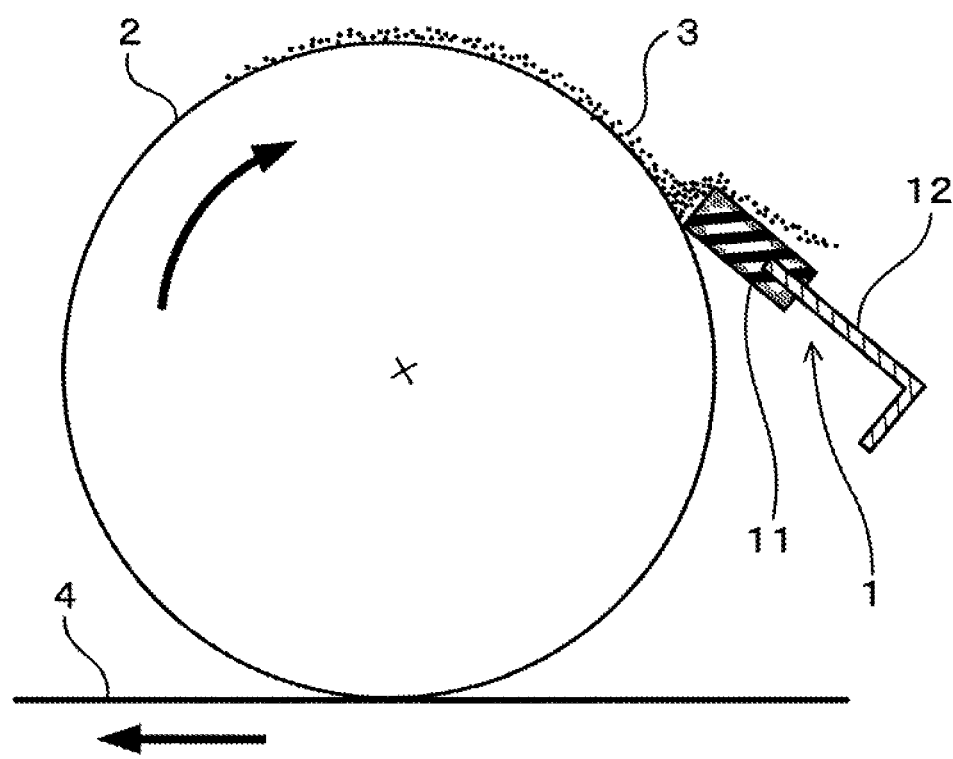
FIG. 1 is a view schematically illustrating a use mode of a blade member obtained by a method for producing a blade member of Embodiment 1.

The method for producing a blade member is a method for producing a blade member to be used for removal of residual toner remaining on a surface of a counterpart member in an electrophotographic image forming device, by sliding contact with the counterpart member. The blade member can be specifically applied as a cleaning blade of the image forming device. Examples of the image forming device can include a copier, a printer, a facsimile machine, a multifunction machine and a POD (Print On Demand) machine employing an electrophotographic system using a charged image. Examples of the counterpart member can include a photoreceptor and an intermediate transfer belt. The blade member can have a configuration in which a blade portion partially serves as a sliding contact portion to be brought into sliding contact with the counterpart member and is in contact with the surface of an operating counterpart member in a sliding manner, to thereby remove the residual toner on the surface of the counterpart member, conveyed to the sliding contact portion, by scraping off.

The method for producing a blade member includes an impregnation step and a cured layer formation step. In the method for producing a blade member, the impregnation step is a step of impregnating at least a portion of the surface of a blade portion made of a polyurethane rubber with a surface treatment liquid.

The blade portion can be prepared by, for example, injecting a urethane rubber composition into the cavity of a mold, and reacting and curing the urethane rubber composition under predetermined conditions. Here, the reaction temperature can be about 110 to 150° C., and the heating time can be about 3 minutes to 20 minutes. In addition, the blade portion molded can be if necessary cut into a predetermined size, then washed with a hydrocarbon solvent, and dried by air blowing or the like. Thus, the blade portion can be prepared. Herein, the blade member can include a holding portion that holds the blade portion, on the rear end portion of the blade portion. In addition, the holding portion can be formed by embedding the front end portion of the holding portion in the rear end portion of the blade portion, or bonding the holding portion to the rear end portion of the blade portion by an adhesive or the like afterward, after formation of the blade portion.

The urethane rubber composition can be prepared as follows. A main agent liquid including a urethane prepolymer obtained by a reaction of a polyisocyanate with a polyol, and a curing agent liquid including a polyol, a chain extender, a crosslinking agent, a catalyst and the like are prepared, and thereafter the main agent liquid and the curing agent liquid are mixed to prepare the urethane rubber composition.

Examples of the polyisocyanate in the main agent liquid include diisocyanates such as 4,4'-diphenylmethane diisocyanate, 2,4-tolylene diisocyanate, 2,6-tolylene diisocyanate, 3,3'-bitolylene-4,4'-diisocyanate, 3,3'-dimethyldiphenylmethane-4,4'-diisocyanate, 2,4-tolylene diisocyanate uretidinedione, 1,5-naphthylene diisocyanate, m-phenylene diisocyanate, hexamethylene diisocyanate, isophorone diisocyanate, 4,4'-dicyclohexylmethane diisocyanate, carbodiimide-modified diphenylmethane diisocyanate, o-toluidine diisocyanate, xylene diisocyanate, p-phenylene diisocyanate and lysine diisocyanate methyl ester; triisocyanates such as triphenylmethane-4,4',4"-triisocyanate; and polymeric diphenylmethane diisocyanate. Such polyisocyanates can be used singly or in combinations of two or more. For the polyisocyanate, diphenylmethane diisocyanate can be suitably used because a required wear resistance is easily ensured, handleability and availability are excellent, and the cost is low, for example.

Examples of the polyol in the main agent liquid can include polyester polyols such as polyethylene adipate, polybutylene adipate, polyhexylene adipate, and a copolymer of ethylene adipate and butylene adipate; and polyether polyols such as polycaprolactone, polyoxytetramethylene glycol and polyoxypropylene glycol. Such polyols can be used singly or in combinations of two or more. For the polyol, any polyester polyol can be suitably used because the resulting blade portion can have an enhanced wear resistance to achieve good durability as compared with the resulting blade portion from use of any ether polyol.

For the polyol in the curing agent liquid, for example, any of the above polyols recited as the polyol in the main agent liquid can be used.

Examples of the chain extender in the curing agent liquid can include polyols having a number average molecular weight of 300 or less, such as ethylene glycol, diethylene glycol, propylene glycol, dipropylene glycol, 1,4-butanediol, hexanediol, 1,4-cyclohexanediol, 1,4-cyclohexanedimethanol, xylene glycol, triethylene glycol, trimethylolpropane, glycerin, pentaerythritol and sorbitol. Such chain extenders can be used singly or in combinations of two or more.

Examples of the catalyst in the curing agent liquid can include amine compounds such as a tertiary amine and organometallic compounds such as an organic tin compound. Such catalysts can be used singly or in combinations of two or more.

The curing agent liquid can if necessary contain additive(s) such as a crosslinking agent, a surfactant, a flame retardant, a colorant, a filler, a plasticizer, a stabilizer, a release agent and a foaming agent, singly or in combinations of two or more.

In the impregnation step, specifically, the surface treatment liquid can be impregnated into a surface including at least the sliding contact portion of the blade portion. The surface treatment liquid here includes a salt of diazabicycloundecene and a carbodiimide-modified polyvalent isocyanate compound.

In the surface treatment liquid, the carbodiimide-modified polyvalent isocyanate compound includes at least a carbodiimide-modified polyvalent isocyanate dimer and a carbodiimide-modified polyvalent isocyanate trimer or higher multimer. Herein, the term "carbodiimide-modified polyvalent isocyanate trimer or higher multimer" is meant to encompass a carbodiimide-modified polyvalent isocyanate trimer and to be able to additionally encompass a multimer (excluding a dimer and a trimer) such as a carbodiimide-modified polyvalent isocyanate tetramer.

In the carbodiimide-modified polyvalent isocyanate compound, the content of the carbodiimide-modified polyvalent isocyanate trimer or higher multimer is 50% by mass or less. Herein, the content of the carbodiimide-modified polyvalent isocyanate trimer or higher multimer corresponds to the value calculated from the mass of the carbodiimide-modified polyvalent isocyanate trimer or higher multimer/the mass of the carbodiimide-modified polyvalent isocyanate compound×100. The carbodiimide-modified polyvalent isocyanate of the trimer or higher multimer has a relatively high molecular weight. Therefore, if the content of the trimer or higher multimer is more than 50% by mass, the rate of impregnation of the surface treatment liquid to the blade portion is decreased. In addition, the carbodiimide-modified polyvalent isocyanate of the trimer or higher multimer is lower in reactivity than the carbodiimide-modified polyvalent isocyanate dimer or the like. If the content of the trimer or higher multimer is more than 50% by mass, the content of the carbodiimide-modified polyvalent isocyanate dimer or the like that is high in reactivity is relatively reduced and curability during heating is also interdependently deteriorated. As a result, an increase in hardness due to the cured layer is hardly achieved. The content of the trimer or higher multimer may be preferably 45% by mass or less, more preferably less than 45% by mass, further preferably 43% by mass or less, still more preferably 40% by mass or less from the viewpoint of enhancing impregnation property of the surface treatment liquid into the blade portion, for example.

In the carbodiimide-modified polyvalent isocyanate compound, the content of the trimer or higher multimer may be preferably 20% by mass or more, more preferably more than 20% by mass, further preferably 22% by mass or more, still more preferably 25% by mass or more from the viewpoint of enhancing stability of the surface treatment liquid, for example.

For the carbodiimide-modified polyvalent isocyanate, specifically, carbodiimide-modified diisocyanate can be suitably used in terms of handleability, availability and the like. More specific examples of the carbodiimide-modified polyvalent isocyanate can include carbodiimide-modified diphenylmethane diisocyanate (carbodiimide-modified MDI), carbodiimide-modified hexamethylene diisocyanate, carbodiimide-modified toluene diisocyanate and carbodiimide-modified isophorone diisocyanate. Among them, carbodiimide-modified diphenylmethane diisocyanate (carbodiimide-modified MDI) may be preferable. In such a case, wear resistance of the cured layer, low frictional property of the cured layer, handleability, availability, a reduction in the cost, and the like are achieved in a well-balanced manner.

The carbodiimide-modified polyvalent isocyanate compound can include, for example, a polyvalent isocyanate monomer, in addition to the carbodiimide-modified polyvalent isocyanate dimer, the carbodiimide-modified polyvalent isocyanate trimer and the like.

The polyvalent isocyanate monomer has a relatively low molecular weight, and therefore is advantageous for an enhancement in impregnation property of the surface treatment liquid into the blade portion. The polyvalent isocyanate monomer, however, has a high reactivity, and therefore causes the surface treatment liquid to be easily gelated by a self-reaction or a reaction with water, if excessively contained. Therefore, when the polyvalent isocyanate monomer is used, the monomer is preferably contained in a proper amount in consideration of the above viewpoint. From the above viewpoint, the total content of the carbodiimide-modified polyvalent isocyanate dimer and the polyvalent isocyanate monomer can be preferably selected from the range from 55 to 80% by mass, more preferably 60 to 75% by mass. Herein, the total content corresponds to the value calculated from (the mass of the carbodiimide-modified polyvalent isocyanate dimer+the mass of the polyvalent isocyanate monomer)/the mass of the carbodiimide-modified polyvalent isocyanate compound×100.

Specific examples of the polyvalent isocyanate of the polyvalent isocyanate monomer can include diphenylmethane diisocyanate, tolylene diisocyanate, bitolylene diisocyanate, dimethyldiphenylmethane diisocyanate, tolylene diisocyanate uretidinedione, naphthylene diisocyanate, m-phenylene diisocyanate, hexamethylene diisocyanate, isophorone diisocyanate and dicyclohexylmethane diisocyanate. Among them, diphenylmethane diisocyanate may be preferable in terms of handleability, availability and the like.

In the surface treatment liquid, the salt of diazabicycloundecene (DBU) serves as a polymerization catalyst. The salt of diazabicycloundecene can be specifically selected from a triazole salt of diazabicycloundecene, a phenol salt of diazabicycloundecene and an octylic acid salt of diazabicycloundecene, singly or in combinations of two or more.

In such a case, the carbodiimide-modified polyvalent isocyanate compound hardly causes a self-reaction or a reaction with water, therefore the surface treatment liquid is hardly gelated before heating, and thus is increased in stability and is easily used for a long time. Therefore, the polymerization reaction of the carbodiimide-modified polyvalent isocyanate compound is still further easily suppressed until the completion of impregnation of the surface treatment liquid. In addition, the polymerization reaction of the carbodiimide-modified polyvalent isocyanate compound during heating can also be sufficiently promoted. For the salt of diazabicycloundecene, more specifically, a triazole salt of diazabicycloundecene and/or a phenol salt of diazabicycloundecene can be suitably used from the viewpoint of easily suppressing reactivity of the carbodiimide-modified polyvalent isocyanate compound at an ordinary temperature, for example.

The salt of diazabicycloundecene can be preferably included in the range from 0.01 to 0.5 parts by mass, more preferably 0.02 to 0.2 parts by mass based on 100 parts by mass of the carbodiimide-modified polyvalent isocyanate compound from the viewpoint of certainly exerting the above effects.

In the surface treatment liquid, the water content is preferably 0.1% by mass or less. Herein, the water content corresponds to the value calculated from the mass of water in the surface treatment liquid/the mass of the surface treatment liquid×100.

In such a case, the water content in the surface treatment liquid is low, and therefore an advantage is that the reaction of the carbodiimide-modified polyvalent isocyanate compound with water is easily suppressed to hardly result in deterioration in impregnation property of the surface treatment liquid.

The water content can be preferably 0.09% by mass or less, more preferably 0.08% by mass or less from the viewpoint of certainly exerting the above effects.

The surface treatment liquid can also include a solvent.

In such a case, the carbodiimide-modified polyvalent isocyanate compound can be diluted with the solvent, and therefore an advantage is that impregnation property of the surface treatment liquid into the blade portion is easily enhanced. An additional advantage is that the rate of impregnation is also easily modulated.

For the solvent, specifically, for example, an organic solvent such as xylene, toluene or methyl ethyl ketone can be suitably used. Such solvents can be used singly or in combinations of two or more. The solvent is, in particular, suitably xylene. Xylene hardly absorbs water, and can sufficiently dissolve the carbodiimide-modified polyvalent isocyanate compound. In addition, xylene allows the surface of the blade portion made of a polyurethane rubber to be appropriately swollen, and therefore is advantageous for an enhancement in impregnation property of the surface treatment liquid into the blade portion. In addition, an additional advantage is that xylene which is impregnated into the blade portion is rapidly volatilized after impregnation and hardly remains in the blade portion.

Herein, impregnation of the surface treatment liquid into the blade portion can be conducted by applying any of various impregnation methods such as an immersion method of immersing the blade portion in the surface treatment liquid, a spray method of spraying the surface treatment liquid on the blade portion surface, and a brush coating method of coating the blade portion surface with the surface treatment liquid by brush.

In the method for producing a blade member, the cured layer formation step is a step of heating and curing the carbodiimide-modified polyvalent isocyanate compound which is impregnated into the blade portion, to form a cured layer.

The heating temperature can be, for example, about 80 to 130° C. The heating time can be, for example, about 30 to 120 minutes.

The method for producing a blade member can include the following step in addition to the impregnation step and the cured layer formation step. Specifically, the method for producing a blade member can include, before the cured layer formation step and after the impregnation step, a removal step of removing the surface treatment liquid remaining on the surface of the blade portion by washing. In such a case, a blade member where a few unrequired cured products remain on the surface of the blade portion is easily obtained. Herein, the surface treatment liquid is easily removed even if remaining on the surface of the blade portion after the impregnation step, because the carbodiimide-modified polyvalent isocyanate compound is hardly cured. The washing can be conducted by application of an organic solvent such as xylene, toluene or methyl ethyl ketone.

Herein, the respective configurations described above can be combined in order to exert the respective effects described above, and the like, as necessary.

EMBODIMENT

Hereinafter, a method for producing a blade member of an embodiment is described with reference to the drawings. The same member is described using the same reference number.

Embodiment 1

Figure 2:
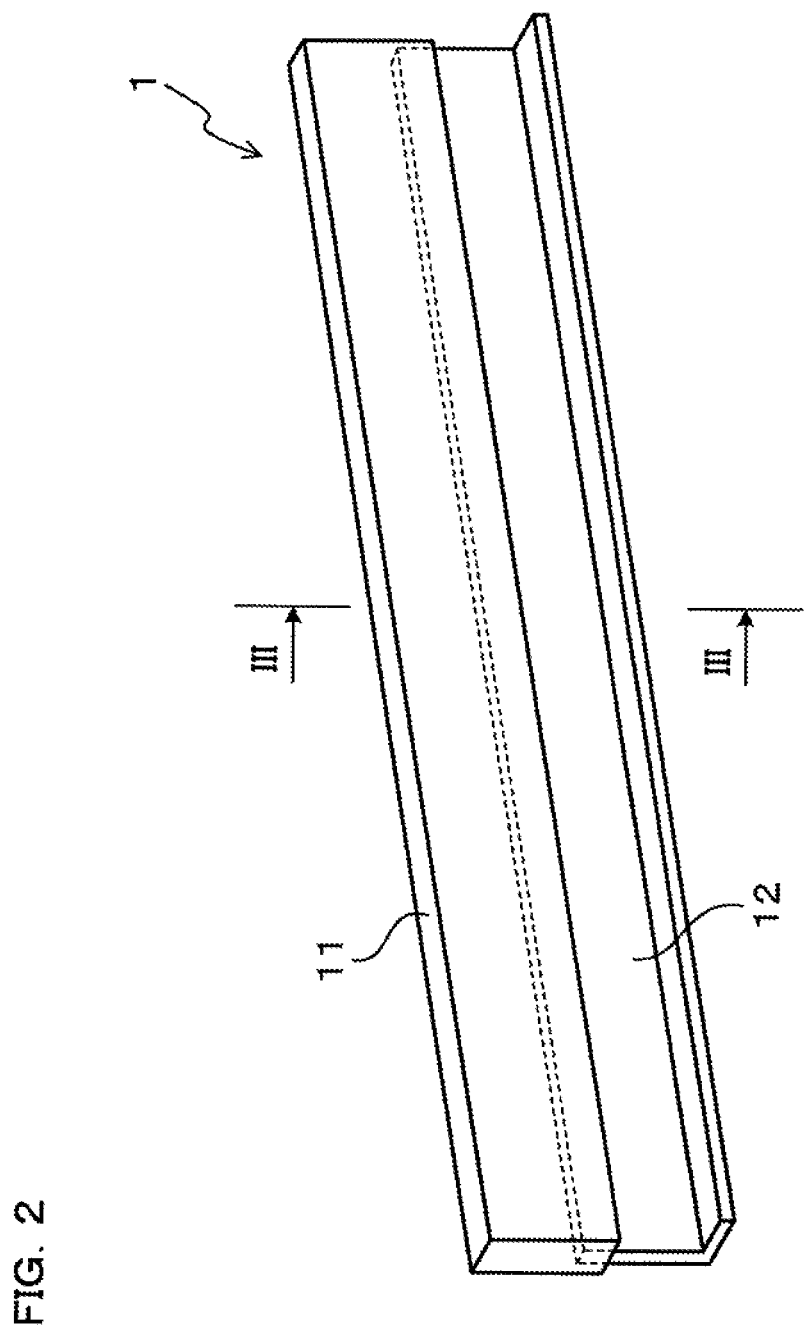
FIG. 2 is a perspective view schematically illustrating the blade member obtained by the method for producing a blade member of Embodiment 1.
Figure 3:
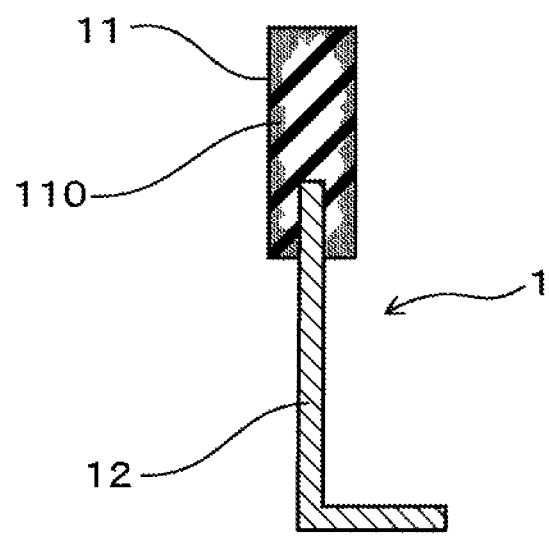
FIG. 3 is a cross-sectional view taken by line III-III in FIG. 2.

A method for producing a blade member of Embodiment 1 is described with reference to FIG. 1 to FIG. 3. As illustrated in FIG. 1 to FIG. 3, the method for producing a blade member of the present Embodiment is a method for producing a blade member 1 to be used for removal of residual toner 3 remaining on a surface of a counterpart member 2 in an electrophotographic image forming device, by sliding contact with the counterpart member 2.

In the present Embodiment, the counterpart member 2 is specifically a photoreceptor drum in the electrophotographic image forming device. The blade member 1 includes a blade portion 11. Specifically, the blade member 1 includes the blade portion 11, and a holding portion 12 that holds the blade portion 11, on the rear end portion of the blade portion 11. The blade member 1 serves as a cleaning blade to scrape off and remove the residual toner 3 (including not only toner but also a toner external additive) remaining on a surface of the photoreceptor drum 2 after fixing of a toner image on paper 4, by bringing the blade portion 11 into sliding contact with the photoreceptor drum 2.

The method for producing a blade member of the present Embodiment includes an impregnation step of impregnating at least a portion of a surface of the blade portion 11 made of a polyurethane rubber with a surface treatment liquid. The surface treatment liquid includes a salt of diazabicycloundecene and a carbodiimide-modified polyvalent isocyanate compound including a carbodiimide-modified polyvalent isocyanate dimer and a carbodiimide-modified polyvalent isocyanate trimer or higher multimer, in which the content of the trimer or higher multimer is 50% by mass or less.

In the present Embodiment, the carbodiimide-modified polyvalent isocyanate compound in the surface treatment liquid additionally includes a polyvalent isocyanate monomer. The carbodiimide-modified polyvalent isocyanate is, specifically, carbodiimide-modified diphenylmethane diisocyanate. The salt of diazabicycloundecene is, specifically, a triazole salt of diazabicycloundecene or a phenol salt of diazabicycloundecene. The surface treatment liquid includes a solvent, and the respective components are dissolved in the solvent. The solvent is, specifically, xylene.

The method for producing a blade member of the present Embodiment also includes a cured layer formation step of heating and curing the carbodiimide-modified polyvalent isocyanate compound which is impregnated into the blade portion 11, to form a cured layer 110.

Hereinafter, the present disclosure is more specifically described with reference to Experimental Example.

Experimental Example 1

Preparation of Urethane Rubber Composition

Forty four parts by mass of polybutylene adipate (PBA) subjected to defoaming in vacuum ("Nippolan 4010" manufactured by Nippon Polyurethane Industry Co., Ltd.) and 56 parts by mass of 4,4'-diphenylmethane diisocyanate (MDI) ("Millionate MT" manufactured by Nippon Polyurethane Industry Co., Ltd.) were mixed at 80° C. for 1 hour, and reacted under a nitrogen atmosphere at 80° C. for 3 hours to thereby prepare a main agent liquid including a urethane prepolymer. Herein, the NCO % (% by mass) in the main agent liquid was 17.0%.

In addition, 87 parts by mass of polybutylene adipate (PBA) ("Nippolan 4010" manufactured by Nippon Polyurethane Industry Co., Ltd.), 13 parts by mass of a low molecular weight polyol obtained by mixing 1,4-butanediol (manufactured by Kitamura Chemicals Co., Ltd.) and trimethylolpropane (manufactured by Nisso Shoji Co., Ltd.) in a molar ratio of 6:4, and 0.01 parts by mass of triethylenediamine (manufactured by Tosoh Corporation) as a catalyst were mixed under a nitrogen atmosphere at 80° C. for 1 hour to thereby prepare a curing agent liquid having a hydroxy value (OHV) of 210 (KOHmg/g).

Next, the main agent liquid and the curing agent liquid both prepared above were mixed under a vacuum atmosphere at 60° C. for 3 minutes so that a compounding ratio of 94 parts by mass of the curing agent liquid to 100 parts by mass of the main agent liquid was satisfied, and the mixture was sufficiently defoamed to thereby prepare a urethane rubber composition.

<Preparation of Blade Portion>

A mold configured from an upper mold and a lower mold was prepared. In the mold, the upper mold and the lower mold are approached and clamped to thereby form a cavity having a size corresponding to two substantially long plateshaped blade portions. The cavity includes two housing portions opposite to each other. Such respective housing portions are each configured so that the front end portion of a holding portion made of a metallic long plate material bent and formed in an-L-shaped cross section can be arranged.

Next, a holding portion was placed in each of the housing portions of the mold, the mold was clamped, and thereafter the urethane rubber composition was injected into the cavity, heated at 130° C. for 10 minutes and thus cured. Thereafter, a molded body was taken out from the mold, and cut into two bodies having a predetermined size. Thus, a molded body in which a blade portion made of a polyurethane rubber and the holding portion were integrated was produced. In the present Example, the blade portion surface was treated with a surface treatment liquid to thereby form a cured layer.

<Preparation of Surface Treatment Liquid>

The following materials were prepared.

Carbodiimide-modified polyvalent isocyanate compound (1) ("Millionate MTL" manufactured by Nippon Polyurethane Industry Co., Ltd.)

35% by mass of a carbodiimide-modified polyvalent isocyanate trimer or higher multimer, and 65% by mass in total of a carbodiimide-modified polyvalent isocyanate dimer and a polyvalent isocyanate monomer Carbodiimide-modified polyvalent isocyanate compound (2) Carbodiimide-modified polyvalent isocyanate compound (1) was distilled at 150° C. for 3 hours to thereby provide carbodiimide-modified polyvalent isocyanate compound (2) including 40% by mass of a carbodiimide-modified polyvalent isocyanate trimer or higher multimer, and 60% by mass in total of a carbodiimide-modified polyvalent isocyanate dimer and a polyvalent isocyanate monomer.

Carbodiimide-modified polyvalent isocyanate compound (3) Carbodiimide-modified polyvalent isocyanate compound (1) was distilled at 150° C. for 5 hours to thereby provide carbodiimide-modified polyvalent isocyanate compound (3) including 45% by mass of a carbodiimide-modified polyvalent isocyanate trimer or higher multimer, and 55% by mass in total of a carbodiimide-modified polyvalent isocyanate dimer and a polyvalent isocyanate monomer.

Carbodiimide-modified polyvalent isocyanate compound (4) Carbodiimide-modified polyvalent isocyanate compound (1) was distilled at 150° C. for 8 hours to thereby provide carbodiimide-modified polyvalent isocyanate compound (4) including 55% by mass of a carbodiimide-modified polyvalent isocyanate trimer or higher multimer, and 45% by mass in total of a carbodiimide-modified polyvalent isocyanate dimer and a polyvalent isocyanate monomer.

Carbodiimide-modified polyvalent isocyanate compound (5) Carbodiimide-modified polyvalent isocyanate compound (1) and a polyvalent isocyanate monomer (MDI monomer) ("Millionate MT" manufactured by Nippon Polyurethane Industry Co., Ltd.) were mixed in a mass ratio of 100:40 to thereby provide carbodiimide-modified polyvalent isocyanate compound (5) including 25% by mass of a carbodiimide-modified polyvalent isocyanate trimer or higher multimer, and 75% by mass in total of a carbodiimide-modified polyvalent isocyanate dimer and a polyvalent isocyanate monomer.

Carbodiimide-modified polyvalent isocyanate compound (6) Carbodiimide-modified polyvalent isocyanate compound (1) and a polyvalent isocyanate monomer (MDI monomer) ("Millionate MT" manufactured by Nippon Polyurethane Industry Co., Ltd.) were mixed in a mass ratio of 100:75 to thereby provide carbodiimide-modified polyvalent isocyanate compound (6) including 20% by mass of a carbodiimide-modified polyvalent isocyanate trimer or higher multimer, and 80% by mass in total of a carbodiimide-modified polyvalent isocyanate dimer and a polyvalent isocyanate monomer.

DBU-triazole salt ("TOYOCAT-DB30" manufactured by Tosoh Corporation)

DBU-phenol salt ("U-CAT SA1" manufactured by San-Apro Ltd.)

DBU-octylic acid salt ("U-CAT SA102" manufactured by San-Apro Ltd.)

Triethylenediamine ("TEDA" manufactured by Tosoh Corporation)

Carboxylic acid salt (potassium acetate)

Quaternary ammonium salt ("DABCO TMR-3" manufactured by Air Products and Chemicals, Inc.)

Xylene (reagent)

As shown in Table 1, 100 parts by mass of a predetermined type of a carbodiimide-modified polyvalent isocyanate compound, predetermined parts by mass of a predetermined type of a polymerization catalyst, and predetermined parts by mass of xylene as a solvent were compounded, and stirred and mixed by a blade stirrer at room temperature for 10 minutes to thereby prepare each of predetermined surface treatment liquids No. 1 to No. 15. With respect to each of the resulting surface treatment liquids, the water content (% by mass) in the surface treatment liquid was measured using a Karl Fischer moisture meter.

—Evaluation of Stability of Surface Treatment Liquid—

Each of the surface treatment liquids was left to still stand under an environment of 25° C. and a humidity of 85% RH. Thereafter, each of the surface treatment liquids was visually observed. A case where no aggregation was observed for 10 hours was rated as "A" where the surface treatment liquid could be stably used for an extremely long time, a case where no aggregation was observed for 5 hours, but aggregation was observed after 5 hours or more was rated as "B" where the surface treatment liquid could be stably used for a relatively long time, and a case where aggregation was observed within 5 hours was rated as "C" where the surface treatment liquid was poor in stability and could not be used for a long time.

<Production of Blade Member Sample>

The blade portion was immersed in each of the predetermined surface treatment liquids shown in Table 1 for 30 minutes, and thereafter the blade portion was taken out from each of the surface treatment liquids. Thus, each of the predetermined surface treatment liquids was impregnated into the surface of the blade portion made of a polyurethane rubber.

Next, each of the predetermined surface treatment liquids remaining on the surface of the blade portion was washed with xylene.

Next, the blade portion was heated at 120° C. Thus, the carbodiimide-modified polyvalent isocyanate compound which was impregnated into the blade portion was heated and cured to form a cured layer. Thus, each blade member of sample 1 to sample 12 was produced as a cleaning blade of an image forming device. The sample number corresponds to the number of the surface treatment liquid used.

Surface treatment liquids No. 13 to No. 15 were poor in stability in Evaluation of stability of surface treatment liquid. Therefore, a blade member sample was not produced using each of such surface treatment liquids.

—Evaluation of Impregnation Property of Surface Treatment Liquid—

With respect to each of the resulting blade member samples, the surface hardness of the blade portion was measured by a MD-1 hardness tester to thereby evaluate impregnation property of each of the surface treatment liquids. A case where the surface hardness for an immersion time of 30 minutes reached 85 degrees or more was rated as "A" where the rate of impregnation was high and impregnation property was excellent, a case where the surface hardness for an immersion time of 30 minutes reached 80 degrees or more and less than 85 degrees was rated as "B" where the rate of impregnation was relatively high and impregnation property was good, and a case where the surface hardness for an immersion time of 30 minutes did not reach 80 degrees was rated as "C" where the rate of impregnation was low and impregnation property was poor.

Table 1 shows the details and the evaluation results of each of the surface treatment liquids produced.

TABLE 1

| | | | Surface Treatment Liquid No. | | | | |
|---|---|---|---|---|---|---|---|
| | | | 1 | 2 | 3 | 4 | 5 |
| Composition of Surface Treatment Liquid | Carbodiimide-Modified Polyvalent Isocyanate Compound | Type | (2) | (1) | (5) | (1) | (1) |
| | Carbodiimide-Modified Polyvalent Isocyanate Dimer and Polyvalent Isocyanate Monomer | (% by mass) | 60 | 65 | 75 | 65 | 65 |
| | Carbodiimide-Modified Polyvalent Isocyanate Trimer or Higher Multimer | (% by mass) | 40 | 35 | 25 | 35 | 35 |
| | Polymerization Catalyst | | | | | | |
| | DBU-Triazole Salt | (parts by mass) | 0.1 | 0.1 | 0.1 | 0.1 | — |
| | DBU-Phenol Salt | (parts by mass) | — | — | — | — | 0.1 |
| | DBU-Octylic Acid Salt | (parts by mass) | — | — | — | — | — |
| | Triethylenediamine | (parts by mass) | — | — | — | — | — |
| | Carboxylic Acid Salt | (parts by mass) | — | — | — | — | — |
| | Quaternary Ammonium Salt | (parts by mass) | — | — | — | — | — |
| | Solvent | | | | | | |
| | Xylene | (parts by mass) | 50 | 50 | 50 | 0 | 50 |
| Water Content in Surface Treatment Liquid | | (% by mass) | 0.08 | 0.08 | 0.08 | 0.08 | 0.08 |
| Stability of Surface Treatment Liquid | | | A | A | A | A | A |
| Impregnation Property of Surface Treatment Liquid | | | A | A | A | A | A |

| | | | Surface Treatment Liquid No. | | | | |
|---|---|---|---|---|---|---|---|
| | | | 6 | 7 | 8 | 9 | 10 |
| Composition of Surface Treatment Liquid | Carbodiimide-Modified Polyvalent Isocyanate Compound | Type | (1) | (1) | (1) | (1) | (3) |
| | Carbodiimide-Modified Polyvalent Isocyanate Dimer and Polyvalent Isocyanate Monomer | (% by mass) | 65 | 65 | 65 | 65 | 55 |
| | Carbodiimide-Modified Polyvalent Isocyanate Trimer or Higher Multimer | (% by mass) | 35 | 35 | 35 | 35 | 45 |
| | Polymerization Catalyst | | | | | | |
| | DBU-Triazole Salt | (parts by mass) | — | 0.1 | 0.01 | 0.5 | 0.1 |
| | DBU-Phenol Salt | (parts by mass) | — | — | — | — | — |
| | DBU-Octylic Acid Salt | (parts by mass) | 0.1 | — | — | — | — |
| | Triethylenediamine | (parts by mass) | — | — | — | — | — |
| | Carboxylic Acid Salt | (parts by mass) | — | — | — | — | — |
| | Quaternary Ammonium Salt | (parts by mass) | — | — | — | — | — |
| | Solvent | | | | | | |
| | Xylene | (parts by mass) | 50 | 50 | 50 | 50 | 50 |
| Water Content in Surface Treatment Liquid | | (% by mass) | 0.08 | 0.1 | 0.08 | 0.08 | 0.1 |
| Stability of Surface Treatment Liquid | | | A | A | A | A | A |
| Impregnation Property of Surface Treatment Liquid | | | A | A | A | A | B |

| | | | Surface Treatment Liquid No. | | | | |
|---|---|---|---|---|---|---|---|
| | | | 11 | 12 | 13 | 14 | 15 |
| Composition of Surface Treatment Liquid | Carbodiimide-Modified Polyvalent Isocyanate Compound | Type | (6) | (4) | (1) | (1) | (1) |
| | Carbodiimide-Modified Polyvalent Isocyanate Dimer and Polyvalent Isocyanate Monomer | (% by mass) | 80 | 45 | 65 | 65 | 63 |

TABLE 1-continued

|  |  |  |  |  |  |  |
|---|---|---|---|---|---|---|
| Carbodiimide-Modified Polyvalent Isocyanate Trimer or Higher Multimer | (% by mass) | 20 | 55 | 35 | 35 | 35 |
| Polymerization Catalyst |  |  |  |  |  |  |
| DBU-Triazole Salt | (parts by mass) | 0.1 | 0.1 | — | — | — |
| DBU-Phenol Salt | (parts by mass) | — | — | — | — | — |
| DBU-Octylic Acid Salt | (parts by mass) | — | — | — | — | — |
| Triethylenediamine | (parts by mass) | — | — | 0.1 | — | — |
| Carboxylic Acid Salt | (parts by mass) | — | — | — | 0.1 | — |
| Quaternary Ammonium Salt | (parts by mass) | — | — | — | — | 0.1 |
| Solvent |  |  |  |  |  |  |
| Xylene | (parts by mass) | 50 | 50 | 50 | 50 | 50 |
| Water Content in Surface Treatment Liquid | (% by mass) | 0.08 | 0.08 | 0.08 | 0.08 | 0.08 |
| Stability of Surface Treatment Liquid |  | B | A | C | C | C |
| Impregnation Property of Surface Treatment Liquid |  | A | C | — | — | — |

(Note 1)
The amount of carbodiimide-modified polyvalent isocyanate compound is 100 parts by mass.

The following can be seen according to Experimental Example above.

The method for producing each blade member of sample 1 to sample 11 includes the impregnation step and the cured layer formation step. In particular, in the method for producing a blade member, the particular surface treatment liquid is used in the impregnation step.

The surface treatment liquid contains the carbodiimide-modified polyvalent isocyanate compound and also the salt of diazabicycloundecene. Therefore, the surface treatment liquid can suppress the polymerization reaction of the carbodiimide-modified polyvalent isocyanate compound in the surface treatment liquid at an ordinary temperature before heating. Therefore, the surface treatment liquid can be stably used for a long time with no gelation before heating.

In addition, the surface treatment liquid, in which the content of the carbodiimide-modified polyvalent isocyanate trimer or higher multimer that has a larger molecular weight than the carbodiimide-modified polyvalent isocyanate dimer and a polyvalent isocyanate monomer is regulated to 50% by mass or less. Accordingly, the rate of impregnation of the surface treatment liquid into the blade portion can be enhanced.

Furthermore, the surface treatment liquid includes the carbodiimide-modified polyvalent isocyanate trimer or higher multimer that is lower in reactivity than the carbodiimide-modified polyvalent isocyanate dimer and a polyvalent isocyanate monomer. Accordingly, the reactivity of the carbodiimide-modified polyvalent isocyanate compound can be suppressed.

Therefore, in the impregnation step, the surface treatment liquid can be relatively quickly impregnated into the blade portion with no gelation, and the polymerization reaction of the carbodiimide-modified polyvalent isocyanate compound can be suppressed until the completion of the impregnation. Moreover, the surface treatment liquid can be impregnated into the blade portion without unevenness. Herein, it can be said that the surface treatment liquid remaining on the surface of the blade portion after the impregnation is easily removed because the carbodiimide-modified polyvalent isocyanate compound is hardly cured.

In the cured layer formation step after the impregnation step, the salt of diazabicycloundecene can promote the polymerization reaction of the carbodiimide-modified polyvalent isocyanate compound during heating, to form a cured layer in the blade portion.

According to the foregoing, it has been confirmed that a method for producing a blade member can be provided in which a polymerization reaction of an isocyanate compound is suppressed until the completion of impregnation of a surface treatment liquid into a blade portion and the polymerization reaction is promoted during heating to thereby allow a cured layer to be formed.

Although Embodiment of the present disclosure has been described above in detail, the present disclosure is not limited to the above Embodiment, and various modifications can be made within the scope that does not impair the effects of the present disclosure.

The invention claimed is:

1. A method for producing a blade member to be used for removal of residual toner remaining on a surface of a counterpart member in an electrophotographic image forming device, by sliding contact with the counterpart member, the method comprising:
    an impregnation step of impregnating at least a portion of a surface of a blade portion made of a polyurethane rubber with a surface treatment liquid that consists essentially of a salt of diazabicycloundecene and a carbodiimide-modified polyvalent isocyanate compound comprising a carbodiimide-modified polyvalent isocyanate dimer and a carbodiimide-modified polyvalent isocyanate trimer or higher multimer, in which a content of the trimer or higher multimer is 50% by mass or less; and
    a cured layer formation step of heating and curing the carbodiimide-modified polyvalent isocyanate compound which is impregnated into the blade portion, to form a cured layer.

2. The method for producing a blade member according to claim 1, wherein the salt of diazabicycloundecene is one or more selected from a triazole salt of diazabicycloundecene, a phenol salt of diazabicycloundecene and an octylic acid salt of diazabicycloundecene.

3. The method for producing a blade member according to claim 1, wherein the carbodiimide-modified polyvalent isocyanate compound comprises a polyvalent isocyanate monomer.

4. The method for producing a blade member according to claim 2, wherein the carbodiimide-modified polyvalent isocyanate compound comprises a polyvalent isocyanate monomer.

5. The method for producing a blade member according to claim 1, wherein the carbodiimide-modified polyvalent isocyanate is carbodiimide-modified diphenylmethane diisocyanate.

6. The method for producing a blade member according to claim 2, wherein the carbodiimide-modified polyvalent isocyanate is carbodiimide-modified diphenylmethane diisocyanate.

7. The method for producing a blade member according to claim 3, wherein the carbodiimide-modified polyvalent isocyanate is carbodiimide-modified diphenylmethane diisocyanate.

8. The method for producing a blade member according to claim 4, wherein the carbodiimide-modified polyvalent isocyanate is carbodiimide-modified diphenylmethane diisocyanate.

9. The method for producing a blade member according to claim 1, wherein the surface treatment liquid has a water content of 0.1% by mass or less.

10. The method for producing a blade member according to claim 2, wherein the surface treatment liquid has a water content of 0.1% by mass or less.

11. The method for producing a blade member according to claim 3, wherein the surface treatment liquid has a water content of 0.1% by mass or less.

12. The method for producing a blade member according to claim 4, wherein the surface treatment liquid has a water content of 0.1% by mass or less.

13. The method for producing a blade member according to claim 5, wherein the surface treatment liquid has a water content of 0.1% by mass or less.

14. The method for producing a blade member according to claim 6, wherein the surface treatment liquid has a water content of 0.1% by mass or less.

15. The method for producing a blade member according to claim 7, wherein the surface treatment liquid has a water content of 0.1% by mass or less.

16. The method for producing a blade member according to claim 8, wherein the surface treatment liquid has a water content of 0.1% by mass or less.

17. The method for producing a blade member according to claim 1, wherein the surface treatment liquid comprises a solvent.

18. The method for producing a blade member according to claim 2, wherein the surface treatment liquid comprises a solvent.

19. The method for producing a blade member according to claim 8, wherein the surface treatment liquid comprises a solvent.

20. The method for producing a blade member according to claim 16, wherein the surface treatment liquid comprises a solvent.

* * * * *